United States Patent
Sorek

(10) Patent No.: US 9,160,546 B2
(45) Date of Patent: *Oct. 13, 2015

(54) AUTHENTICATING USERS BASED UPON AN IDENTITY FOOTPRINT

(71) Applicant: BROADCOM CORPORATION, Irvine, CA (US)

(72) Inventor: Noam Sorek, Zichron Yacoov (IL)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,175

(22) Filed: Oct. 13, 2014

(65) Prior Publication Data

US 2015/0058961 A1 Feb. 26, 2015

Related U.S. Application Data

(63) Continuation of application No. 13/537,672, filed on Jun. 29, 2012, now Pat. No. 8,863,307.

(60) Provisional application No. 61/655,653, filed on Jun. 5, 2012.

(51) Int. Cl.
| | |
|---|---|
| H04L 9/00 | (2006.01) |
| H04L 9/32 | (2006.01) |
| H04L 29/06 | (2006.01) |
| H04W 4/02 | (2009.01) |
| H04W 12/06 | (2009.01) |

(Continued)

(52) U.S. Cl.
CPC .......... *H04L 9/3297* (2013.01); *G06Q 20/4016* (2013.01); *H04L 63/0492* (2013.01); *H04L 63/0815* (2013.01); *H04L 63/107* (2013.01); *H04W 4/021* (2013.01); *H04W 12/06* (2013.01); *H04W 12/12* (2013.01)

(58) Field of Classification Search
CPC ..... H04L 63/107; H04L 63/10; H04W 12/06; H04W 12/12
See application file for complete search history.

(56) References Cited

U.S. PATENT DOCUMENTS

| | | | |
|---|---|---|---|
| 7,689,524 B2 * | 3/2010 | Ozzie et al. | 706/45 |
| 7,908,645 B2 * | 3/2011 | Varghese et al. | 726/4 |
| 8,214,642 B2 * | 7/2012 | Baentsch et al. | 713/168 |

(Continued)

FOREIGN PATENT DOCUMENTS

| | | |
|---|---|---|
| TW | I353526 B | 12/2011 |
| TW | I353748 B | 12/2011 |

(Continued)

OTHER PUBLICATIONS

Denning, et al., "Location-Based Authentication: Grounding Cyberspace for Better Security," Computer Fraud and Security, Oxford GB, Feb 1, 1996, pp. 12-16 (SP002117683).

*Primary Examiner* — Taghi Arani
*Assistant Examiner* — Sharon Lynch
(74) *Attorney, Agent, or Firm* — McDermott Will & Emery LLP

(57) ABSTRACT

Disclosed are various embodiments of generating a user signature associated with a user and authenticating a user. At least one behavior associated with at least one sensor in a computing device is identified. A timestamp is generated and associated with the behavior. A user signature corresponding to a user based at least in part upon the behavior and the timestamp is generated and stored.

20 Claims, 4 Drawing Sheets

(51) Int. Cl.
  *G06Q 20/40* (2012.01)
  *H04W 12/12* (2009.01)

(56) References Cited

U.S. PATENT DOCUMENTS

| | | | |
|---|---|---|---|
| 8,279,860 B1* | 10/2012 | Nucci et al. | 370/356 |
| 8,359,278 B2* | 1/2013 | Domenikos et al. | 705/325 |
| 8,364,120 B2* | 1/2013 | Kuhlman et al. | 455/411 |
| 8,590,018 B2* | 11/2013 | Thavasi et al. | 726/4 |
| 8,613,064 B1* | 12/2013 | Roy | 726/7 |
| 8,680,995 B2* | 3/2014 | G et al. | 340/541 |
| 2002/0184080 A1* | 12/2002 | Murad et al. | 705/10 |
| 2004/0117624 A1* | 6/2004 | Brandt et al. | 713/166 |
| 2005/0076230 A1* | 4/2005 | Redenbaugh et al. | 713/200 |
| 2005/0212760 A1 | 9/2005 | Marvit et al. | |
| 2006/0223495 A1* | 10/2006 | Cassett et al. | 455/405 |
| 2006/0282660 A1* | 12/2006 | Varghese et al. | 713/155 |
| 2007/0038568 A1* | 2/2007 | Greene et al. | 705/50 |
| 2007/0061273 A1* | 3/2007 | Greene et al. | 705/80 |
| 2007/0073630 A1* | 3/2007 | Greene et al. | 705/80 |
| 2007/0244633 A1* | 10/2007 | Phillips et al. | 701/207 |
| 2008/0033637 A1* | 2/2008 | Kuhlman et al. | 701/202 |
| 2008/0155651 A1* | 6/2008 | Wasmund | 726/2 |
| 2008/0222706 A1* | 9/2008 | Renaud et al. | 726/4 |
| 2009/0049544 A1* | 2/2009 | Kashi | 726/19 |
| 2009/0203355 A1* | 8/2009 | Clark | 455/411 |
| 2010/0004997 A1 | 1/2010 | Mehta et al. | |
| 2010/0192209 A1* | 7/2010 | Steeves et al. | 726/7 |
| 2011/0225644 A1* | 9/2011 | Pullikottil et al. | 726/11 |
| 2011/0231225 A1* | 9/2011 | Winters | 705/7.29 |
| 2012/0233658 A1* | 9/2012 | Piersol | 726/2 |
| 2013/0042327 A1* | 2/2013 | Chow | 726/28 |
| 2013/0067546 A1* | 3/2013 | Thavasi et al. | 726/7 |
| 2013/0326600 A1 | 12/2013 | Sorek | |
| 2013/0332109 A1* | 12/2013 | Luiset et al. | 702/179 |
| 2015/0067844 A1* | 3/2015 | Brandt et al. | 726/22 |

FOREIGN PATENT DOCUMENTS

| | | |
|---|---|---|
| TW | I353759 B | 12/2011 |
| TW | I354473 B | 12/2011 |
| WO | WO-2008/039872 A2 | 4/2008 |

* cited by examiner

AUTHENTICATING USERS BASED UPON AN IDENTITY FOOTPRINT

CROSS-REFERENCE TO RELATED APPLICATIONS

This application is a continuation of U.S. patent application Ser. No. 13/537,672, filed Jun. 29, 2012, entitled "Authenticating Users Based Upon an Identity Footprint," now issued as U.S. Pat. No. 8,863,307, which claims the benefit of U.S. provisional application entitled, "Authenticating Users Based Upon an Identity Footprint," having Ser. No. 61/655,653, filed Jun. 5, 2012, both of which are entirely incorporated herein by reference.

System security that is based upon user authentication with password verification is a security framework that can be compromised. For example, an attacker may acquire or generate a username/password combination that can be used by the attacker to gain access to a system with a user's credentials simply by presenting the user's username/password pair. Additionally, near field communication (NFC), radio frequency identification (RFID) and other types of radio frequency communication may allow for user authentication without a username/password pair, but simply by presentation of a user's device. Accordingly, in such a scenario, an attacker can gain access to a system associated with the user simply by presenting the user's device containing the appropriate NFC and/or RFID credentials and without presenting a password and/or passphrase, which can be a significant risk in the event of a lost and/or stolen mobile device of a user.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Embodiments of the present disclosure are directed to generating of a user signature, or user footprint, that is based upon the behaviors of the user, via a mobile device or other type of computing system, as they relate to the user's interactions with the outside world. By observing and tracking the behaviors of a user through the various types of sensors that are integrated within a user's device, a user signature based upon the behavioral trends can be generated and used to authenticate the user at a later point in time, for example, where authentication of the user's identity is requested. In the context of this disclosure, a sensor can be any of various environmental sensors that can be integrated within a mobile device and/or computing system. For example, the sensor can include an accelerometer configured to detect acceleration or movements of a device. The sensor can also include a gyroscope configured to detect orientation of a device. The sensor can include a global navigation satellite system (GNSS) chipset that communicates with a GNSS system, e.g., global positioning system (GPS), Globalnaya Navigatsionnaya Sputnikovaya Sistema (GLONASS), Indian Regional Navigational Satellite System (IRNSS), Galileo, etc.

The sensor may be a sensor configured to detect velocity, or any other type of movement. Additionally, a sensor in the context of this disclosure can include a network interface that is configured to communicate with a network (e.g., a wired and/or wireless network). In this scenario, the sensor can be the network interface, which can provide information about networks with which the interface is connected or those that it is within range of (e.g., service set identifier, network name, base station identifier, or other identifying information about a network).

Therefore, an embodiment of the disclosure can detect behavior of a user via the sensors associated with the user's mobile device (e.g., smartphone, tablet computing system, laptop computing system, media player, etc.). These behaviors can be associated with a timestamp, and a user signature generated that is based at least in part upon one or more behavior/timestamp pairs. In this way, the user signature can contain a representation of the user's daily and/or weekly routine that can used to authenticate the user. Such a form of authentication can be used in combination with the username/password pair, a personal identification number, passphrase, and/or in combination with NFC and/or RFID authentication. If an attacker gains possession of the user's device, the attacker may not exhibit behaviors that correspond to the user's behaviors as detected by the sensors in the device. Accordingly, even if the attacker gains possession of the user's device and/or the user's credentials, the attacker may be unable to bypass such a form of authentication.

Figure 1:
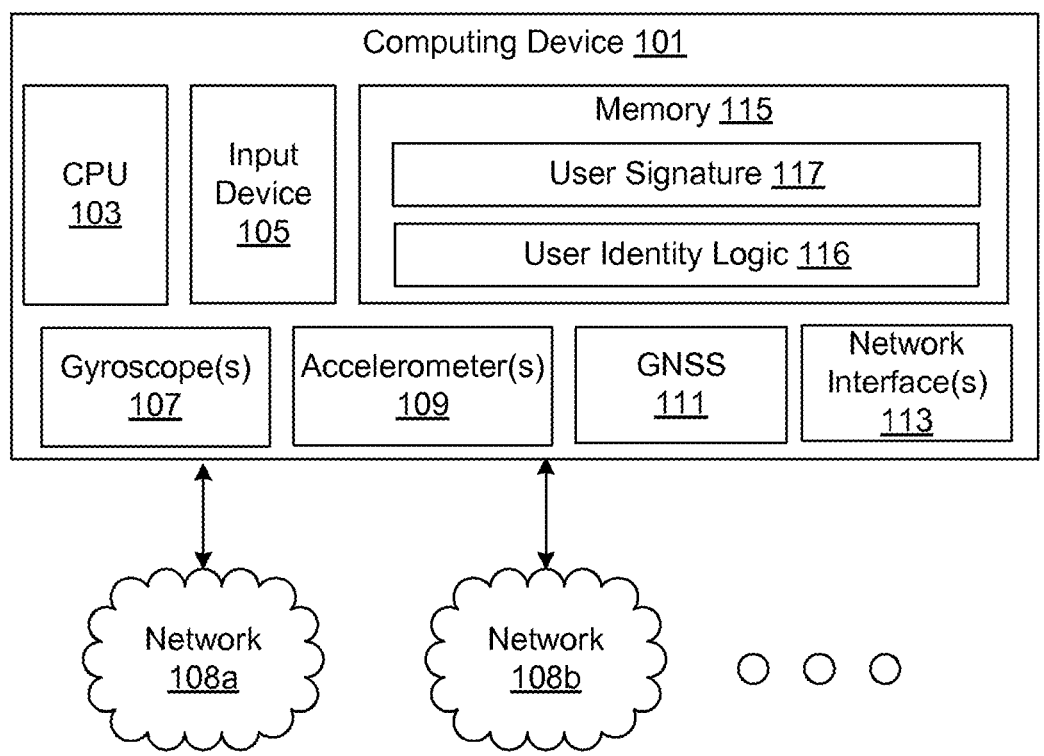
FIG. 1 is a drawing of networked environment illustrating a computing device according to various embodiments of the disclosure.

With reference to FIG. 1, shown is a networked environment 100 according to various embodiments. The networked environment 100 includes a computing device 101 in communication with one or more network 108a, 108b, etc. The network 108 may include, for example, the Internet, intranets, extranets, wide area networks (WANs), local area networks (LANs), wired networks, wireless networks, or other suitable networks, etc., or any combination of two or more such networks. For example, the network 108a can comprise a wireless carrier network with which the computing device 101 is coupled. The network 108b can comprise a wireless local area network 108b with which the computing device 101 is coupled. The computing device 101 can be in communication with or within communication range of any number of networks 108 at various points in time.

The computing device 101 may comprise, for example, a processor-based system such as a computer system. Such a computer system may be embodied in the form of a desktop computer, a laptop computer, a personal digital assistant, a smartphone, cellular telephone, set-top box, music players, web pads, tablet computer systems, game consoles, or other devices with like capability. The computing device 101 can comprise one or more central processing units 103 (CPU) that executes software applications and facilitates interactions with the various hardware capabilities of the computing device 101. The computing device 101 is also configured with at least one input device 105 with which a user can interact with a user interface rendered on a display associated with the computing device 101. In one embodiment, the input device 105 can comprise a capacitive touchscreen input device that is integrated with a display of the computing device 101. In another embodiment, the input device 105 can comprise a keyboard and/or mouse in communication with the computing device 101.

The computing device 101 can also comprise at least one gyroscope 107 from which orientation of the computing device 101 can be determined. The gyroscope 107 can comprise a MEMS gyroscope that can provide angular momentum data and/or orientation data to the CPU 103 or other systems in the computing device 101. The computing device 101 can also comprise at least one accelerometer 109 that can determine acceleration, or the rate of change of velocity, and provide acceleration data to the CPU 103 or other systems within the computing device 101. The computing device 101, in some embodiments, also comprises a GNSS chipset 111 that facilitates communication with a satellite navigation system. The GNSS chipset 111 provides location data when requested to the CPU 103 or other systems within the computing device 101.

The computing device 101 can also include one or more network interfaces 113 that facilitate communication with one or more networks 108. The computing device 101 can include a first network interface 113 that can communicate with a wireless local area network, such as an 802.11b/g/n network. The computing device 101 can also include a second network interface 113 that can communicate with a wireless wide area network, such as one or more cellular voice and/or data networks. The computing device 101 can include additional network interfaces 113 in various combinations to facilitate network communication capabilities. Additionally, the network interfaces 113 can provide information about networks 108 with which the computing device 101 is within range or with which the computing device 101 is in communication. It should be appreciated that any of these sensors and/or interfaces can be integrated into a single module, chipset, and/or motherboard that are in communication with the CPU 103.

The computing device 101 also includes one or more memory 115 devices that can store software applications and/or other data executed by and/or accessible by the CPU 103. In an embodiment of the present disclosure, the memory 115 can store user identity logic 116 that is executed by the computing device 101 as well as a user signature 117 corresponding to the behaviors of a user associated with the computing device 101. In some embodiments, the user identity logic 116 can be implemented in processing circuitry that is integrated into the computing device 101.

In other words, the memory 115 includes various applications and/or other functionality executed in the computing device 101 according to various embodiments. The components executed on the computing device 101, for example, include the user identity logic 116, and other applications, services, processes, systems, engines, or functionality not discussed in detail herein. The user identity logic 116 is configured to generate a user signature 117 corresponding to a user associated with the computing device 101. In some embodiments, the computing device 101 can include digital logic or any other circuitry that is configured to perform the steps of the user identity logic 116 as well as store the user signature 117 and its various dimensions as described herein. It should be appreciated that the depicted embodiment in FIG. 1 is only one example.

The user identity logic 116 generates a user signature 117 by periodically obtaining data from one or more of the various sensors in the computing device 101, such as the GNSS chipset 111, the gyroscope 107, the accelerometer 109, the network interface 113, or other sensors, and associating data from the various sensors with a timestamp. Additional examples of sensors can include a keyboard, capacitive touchscreen input device, and a power and/or charging connection, an ambient light level sensor, and/or a microphone. Additionally, the various sensors can be implemented in one or more integrated and/or proprietary units to reduce the possibility of an attacker replacing or spoofing data from one or more of the sensors. The timestamp can be obtained from a clock associated with the CPU 103, time data retrieved from the GNSS chipset 111, or other clock associated with the computing device 101. In this way, the user signature 117 can represent an expression of a daily, weekly, or any other periodic routine associated with the user. In some embodiments, the user identity logic 116 can comprise an event based architecture that obtains information from the various sensors in the computing device 101 when an event occurs. That is to say, when an event occurs that represents a change in the location, acceleration, velocity, and/or networks with which the computing device 101 is associated, the user identity logic 116 can obtain relevant data associated with the event and associate the data with a timestamp and the user signature 117.

For example, the user identity logic 116 can obtain periodic and/or event based location data associated with computing device 101 from the GNSS chipset 111. The location data can be associated with a timestamp as a part of the user signature 117. In this way, the user signature 117 can capture the daily routine of the user as it is related to the location of the computing device 101. For example, if the computing device 101, and hence the user, is consistently located with a handful of geographic locations (e.g., home, office, and points in between that are associated with a commute), the user identity logic 116 can obtain these locations from the GNSS chipset 111 and associate them with respective timestamps, thereby learning the daily routine of a user. Additionally, the user identity logic 116 also obtains location data associated with the user that may not represent a home and/or office location (e.g., during a weekend) and associate location data with a timestamp, thereby learning a routine of the user for when the user may be in other locations. The location data and corresponding timestamps can be stored as a part of the user signature 117 so that the user signature 117 contains information about the user's customary routine or pattern in terms of geographic location.

Therefore, the user identity logic 116 can detect when an attacker is potentially in possession of the computing device 101 if the location of computing device 101 reflects a deviation from the user's routine that is embodied in the user signature 117. In some cases, the user signature 117 may reflect little or no pattern or customary routine. In this scenario, the absence of a pattern may be a distinctive feature of the user signature 117, and the user identity logic 116 may detect that an attacker is in possession of the device if the attacker suddenly exhibits a rigid pattern of movements in terms of the location of the computing device 101.

As another example, the user identity logic 116 can obtain periodic and/or event based angular orientation data associated with computing device 101 from the gyroscope 107. The angular orientation can be associated with a timestamp as a part of the user signature 117. In this way, the user signature 117 can capture the daily routine of the user as it is related to the orientation of the computing device 101. For example, if the computing device 101, and hence the user, is consistently employing specific angular orientations, the user identity logic 116 can associate these angular orientations with timestamps and store the orientation data as a part of the user signature 117. In this way, although specific timestamps associated with orientation data may be less useful in this scenario, the user identity logic 116 can learn the user's preference as it pertains to an orientation in which the user holds the computing device 101 when the device is in use. The orientation data and corresponding timestamps can be stored as a part of the user signature 117 so that the user signature 117 contains information about the user's customary routine in terms of angular orientation of the computing device 101.

As another example, the user identity logic 116 can obtain periodic and/or event based acceleration data associated with computing device 101 from the accelerometer 109. The acceleration data can be associated with a timestamp as a part of the user signature 117. In this way, the user signature 117 can capture the daily routine of the user as it is related to the acceleration and/or velocity of the computing device 101. For example, if the computing device 101, and hence the user, consistently travels by a certain mode of transportation in a daily commute (e.g., train, bike, car, walking), acceleration data from the accelerometer 109 may exhibit a pattern that is embodied in the user signature 117. The acceleration data and corresponding timestamps can be stored as a part of the user signature 117 so that the user signature 117 contains information about the user's customary routine or pattern in terms of movement.

Therefore, the user identity logic 116 can detect when an attacker is potentially in possession of the device when acceleration data from the accelerometer 109 deviates from a pattern reflected in the user signature 117. For example, if the acceleration data reflects varying levels of acceleration relative to those reflected in the user signature 117, the user identity logic 116 can detect that an attacker is potentially in possession of the device. As another example, if the user identity logic 116 detects acceleration at varying times of the data relative to that which is reflected in the user signature 117, the user identity logic 116 can similarly detect that an attacker is potentially in possession of the computing device 101. In some cases, the user signature 117 may reflect little or no pattern or customary routine. In this scenario, the absence of a pattern may be a distinctive feature of the user signature 117, and the user identity logic 116 may detect that an attacker is in possession of the device if the attacker suddenly exhibits a rigid pattern of movements in terms of the acceleration and/or velocity of the computing device 101.

As another example, the user identity logic 116 can obtain periodic and/or event based network data associated with computing device 101 from the one or more network interfaces 113. The network data can represent data about networks with which the computing device 101 is in communication and/or within range. These networks can be associated with a timestamp as a part of the user signature 117. For example, the network interfaces 113 can provide data regarding network traffic, bandwidth consumption, call data, websites visited, and other network related data to the user identity logic 116. The user identity logic 116 can associated some or all of this network data with a timestamp as a part of the user signature 117. In this way, the user identity logic 116 can learn the user's habits regarding network usage, when the user typically initiates or receives calls, the favorite sites of the user, or other information. Therefore, the user identity logic 116 can detect that an attacker is potentially in possession of the computing device 101 if the network usage data deviates from that which is embodied in the user signature 117.

As an additional example, in the case of a cellular network interface 113, the network interface 113 can provide information about cellular base stations with which the computing device 101 is communicating or within range, which can also be associated with a timestamp. In this way, the user identity logic 116 can learn the user's routine regarding how they communicate with the cellular network in terms of the base stations with which the computing device 101 typically communicates to access the cellular network as well as a time of day that the computing device 101 is in communication with these base stations. Therefore, the user identity logic 116 can detect that an attacker is potentially in possession of the computing device 101 if the cellular network data deviates from that which is embodied in the user signature 117.

As another example, in the case of a wireless local area network interface 113, the network interface 113 can provide data about wireless networks with which the computing device 101 is communicating or within range and associate these networks with a timestamp. In this way, the user signature 117 can capture the daily routine of the user as it is related to the networks with which the computing device 101 communicates and/or is within communication range. For example, if the computing device 101, and hence the user, is consistently within communication range of a wireless network having a particular SSID and/or network device having a particular Internet protocol address and/or media access control address, data received from the network interface 113 may exhibit a pattern that is embodied in the user signature 117. This network data and corresponding timestamps can be stored as a part of the user signature 117 so that the user signature 117 contains information about the user's customary routine or pattern in terms of networks that are within range of or in communication with the network interface 113.

Therefore, the user identity logic 116 can detect when an attacker is potentially in possession of the device when networks that are within range of or in communication with the network interface 113 deviate from a pattern reflected in the user signature 117. For example, if the network interface 113 is suddenly consistently within range of new or different networks, the user identity logic 116 can detect that an attacker is potentially in possession of the device. As another example, if the user identity logic 116 detects networks at varying times of the data relative to that which is reflected in the user signature 117, the user identity logic 116 can similarly detect that an attacker is potentially in possession of the computing device 101. In some cases, the user signature 117 may reflect little or no pattern or customary routine. In this scenario, the absence of a pattern may be a distinctive feature of the user signature 117, and the user identity logic 116 may detect that an attacker is in possession of the device if the attacker suddenly exhibits a rigid pattern in terms of the networks within range of or in communication with the computing device 101.

As another example, the user identity logic 116 can obtain periodic and/or event based user input data associated with the computing device 101 from the input device 105. The user input data can be associated with a timestamp as a part of the user signature 117. In this way, the user signature 117 can capture characteristics of how the user interacts with the input device 105 of the computing device 101. For example, if the computing device 101, and hence the user, consistently types at a certain speed, moves a mouse at certain arc angles, performs gestures using a touch input device in a certain way, or exhibits any other user input patterns, these patterns can be embodied in the user signature 117.

Therefore, the user identity logic 116 can detect when an attacker is potentially in possession of the device when user input data from the input device 105 deviates from a pattern reflected in the user signature 117. For example, if the user input data reflects varying typing speeds, mouse arc angles, and/or swipe speeds that are associated with a touch input device, the user identity logic 116 can detect that an attacker is potentially in possession of the device. In some cases, the user signature 117 may reflect little or no pattern or customary routine. In this scenario, the absence of a pattern may be a distinctive feature of the user signature 117, and the user identity logic 116 may detect that an attacker is in possession of the device if the attacker suddenly exhibits a rigid pattern of interactions with the input device 105 of the computing device 101.

The user identity logic 116 can incorporate one or more of the above types of data from a sensor of the computing device 101 as a part of the user signature 117. The user signature 117, in some embodiments, can comprise a table that includes the various behavior data obtained from the sensors of the computing device 101 as well as a corresponding timestamp. In some embodiments, the user signature 117 can be encrypted and stored in the memory and/or a mass storage device associated with the computing device 101.

Accordingly, the user identity logic 116 can authenticate a user based upon the data obtained from the computing device 101 sensors. In one embodiment, a user signature 117 is generated and stored within the computing device 101. In one scenario, if the user engages in a transaction, for example, where user authentication is requested (e.g., a banking transaction, point of sale transaction, etc.) by the entity with which the user is interacting, the user identity logic 116 can examine behaviors from data obtained from the various sensors in the computing device 101 that are associated with a preceding period of time (e.g., one day, one week, etc.). In this scenario, the user identity logic 116 can obtain an authentication request from a system requesting authentication. The user identity logic 116 can then determine whether the behaviors deviate from those embodied in the user signature 117 stored in the computing device 101. If the behaviors from a preceding period of time deviate from the behaviors specified in the user signature 117, the user identity logic 116 can cause authentication of the user to fail. If authentication fails, the user identity logic 116 can transmit an authentication failure to the requesting system.

In such a scenario, the user identity logic 116 can examine data from the sensors for a preceding time period to determine a degree of deviation from the user signature 117. In some embodiments, the authentication request can include a field that specifies an importance level of the transaction for which authentication is sought. When a greater degree of importance is associated with a transaction, the user identity logic 116 can require a closer conformance of behaviors from the preceding time period to the user signature 117 in order to generate a successful authentication.

To determine whether an authentication request succeeds or fails, the user identity logic 116 can examine each component of the user signature 117 and determine whether the behaviors from a recent preceding time period conform to the user signature 117. For example, the user identity logic 116 can examine whether the location based components (location and associated timestamps) of the user signature 117 conform to the location data obtained from the GNSS chipset 111 for a preceding day, week, month, etc. If the location data for the preceding time period varies a great degree from the user signature 117 location data, the user identity logic 116 can cause authentication of the user to fail and issue an authentication failure. Additionally, the user identity logic 116 can perform the same analysis for the preceding time period for data obtained from the other sensors (e.g., input device 105, gyroscope 107, accelerometer 109, network interface 113) and determine whether behavior associated with the preceding time period varies from the user signature 117.

For example, the user identity logic 116 can examine whether the networks that the computing device 101 is in communication with or range of during the preceding time period are the same or similar to those specified in the user signature 117. Additionally, even if the networks associated with the preceding time period are similar to those in the user signature 117, the user identity logic 116 can determine whether the timestamps associated with networks are within a predetermined threshold time period of those in the user signature 117. In other words, the user identity logic 116 determines whether the network interface 113 is in communication with the same or similar networks at a similar time of the day relative to the user signature 117.

Similarly, the user identity logic 116 can examine whether the accelerometer 109 data is similar to that which is embodied in the user signature 117, which can give an indication of whether movements of the computing device 101 are associated with a similar velocity and/or acceleration relative to the user signature 117. In this way, if the computing device 101 is associated with acceleration data that varies widely from that which is embodied in the user signature 117, the user identity logic 116 can cause authentication to fail and issue an authentication failure. As noted above, the user identity logic 116 can conduct similar analyses on data obtained from the other sensors in the computing device 101.

In some embodiments, authentication of a user based upon a user signature 117 can be performed in a device other than the computing device 101 with which the user signature 117 is associated. For example, the user identity logic 116 can be configured to transmit the user signature 117 in an encrypted form to a remote server so that the user signature 117 is stored on the remote server. Accordingly, authentication of the user signature 117 can then be performed on the user signature when authentication by determining whether the sensor data corresponding to a preceding time period relative to the authentication request (e.g., the previous twenty-four hours) corresponds to the behaviors defined by the user signature 117. In such a scenario, the user identity logic 116 can provide sensor data corresponding to the preceding time period to the remote system to perform the authentication.

Figure 2:
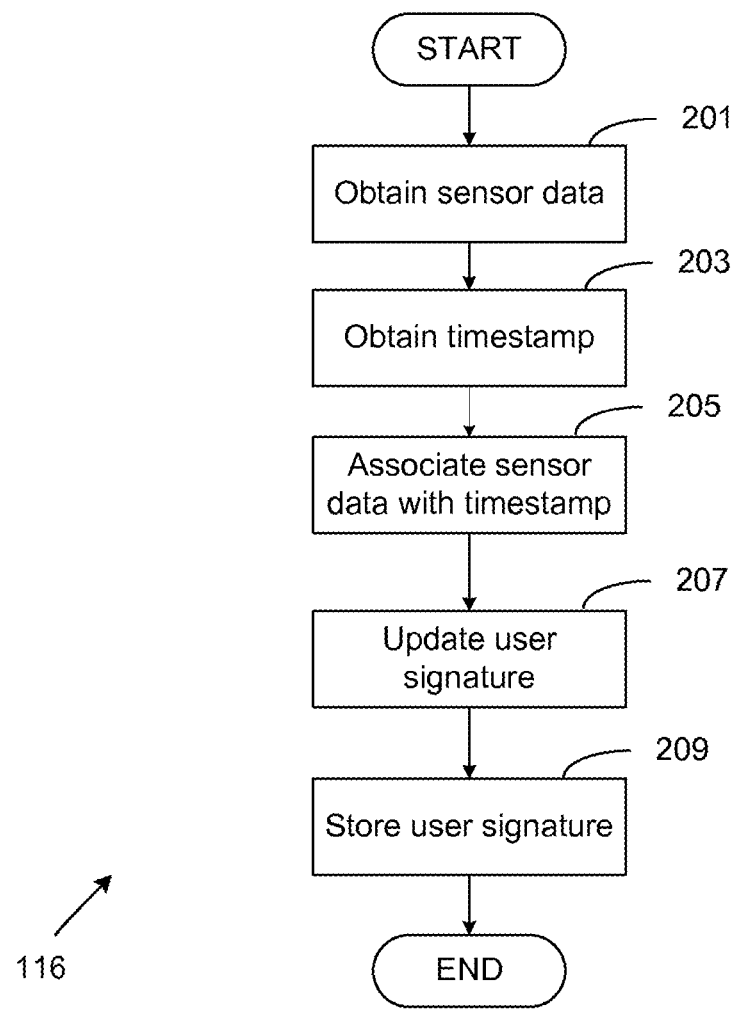
FIG. 2 is a flowchart illustrating one example of functionality implemented as portions of user identity logic executed in a computing device in the networked environment of FIG. 1 according to various embodiments of the present disclosure.

Referring next to FIG. 2, shown is a flowchart that provides one example of the operation of a portion of the user identity logic 116 to generate a user signature 117 according to various embodiments. It is understood that the flowchart of FIG. 2 provides merely an example of the many different types of functional arrangements that may be employed to implement the operation of the portion of the user identity logic 116 as described herein. As an alternative, the flowchart of FIG. 2 may be viewed as depicting an example of steps of a method implemented in the computing device 101 (FIG. 1) according to one or more embodiments.

First, the user identity logic 116 obtains sensor data from one or more of the various sensors associated with the computing device 101, such as the input device 105, the gyroscope 107, the accelerometer 109, the GNSS chipset 111, the network interface 113, and any other sensors associated with the computing device 101 (201). As described above, the sensor data can be obtained periodically or intermittently and provided by the respective sensors based upon events occurring with respect to the sensors. For example, if the GNSS chipset 111 detects that the location and/or velocity of the computing device 101 has changed, the GNSS chipset 111 generate a location event corresponding to the change in location and/or velocity, which can be obtained by the user identity logic 116. As another example, when there is a change in the networks with which the network interface 113 is communicating or of which a network interface 113 is within range, the network interface 113 can generate a corresponding event, which can be obtained by the user identity logic 116. As another example, when the accelerometer 109 detects an acceleration that exceeds a predefined threshold, the acceleration data can be associated with a timestamp by the user identity logic 116 and the user signature 117 updated. Also, when the gyroscope 107 indicates a change in the orientation of the computing device 101, a corresponding event can be obtained by the user identity logic 116 and incorporated into the user signature 117.

Next, the user identity logic 116 can obtain a timestamp associated with the sensor data (203). The user identity logic 116 can then associate the obtained sensor data with the timestamp (205). The user signature is then updated with the sensor data associated with the timestamp (207). Next, the user identity logic 116 can save the user signature 117 (209). As noted above, the user signature 117 can be encrypted and stored in a memory and/or mass storage device associated with the computing device 101, which can include a flash memory, magnetic hard disk, or other storage medium.

Figure 3:
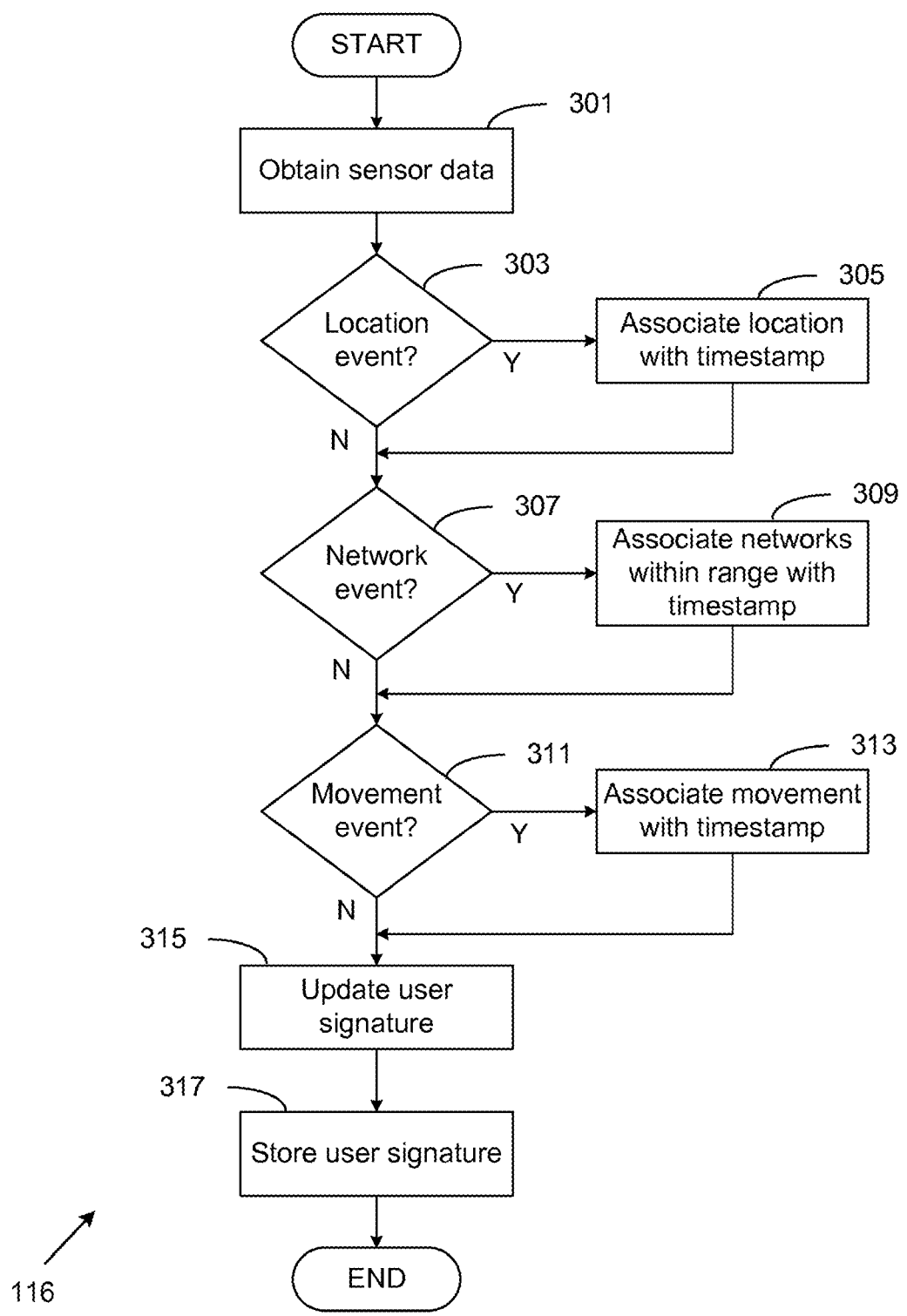
FIG. 3 is a flowchart illustrating another example of functionality implemented as portions of user identity logic executed in a computing device in the networked environment of FIG. 1 according to various embodiments of the present disclosure.

Referring next to FIG. 3, shown is a flowchart that provides one example of the operation of a portion of the user identity logic 116 to generate a user signature 117 according to various embodiments. It is understood that the flowchart of FIG. 3 provides merely an example of the many different types of functional arrangements that may be employed to implement the operation of the portion of the user identity logic 116 as described herein. As an alternative, the flowchart of FIG. 3 may be viewed as depicting an example of steps of a method implemented in the computing device 101 (FIG. 1) according to one or more embodiments.

First, the user identity logic 116 can obtain sensor data from the various sensors associated with the computing device 101 (301). Next, the user identity logic 116 can determine whether a location event can be obtained from the GNSS chipset 111 or one or more other sensors in the computing device 101 (303). When a location event is obtained, the location event is associated with a timestamp (305). A location event can include a change in the location of the computing device as determined by the GNSS chipset 111 or other sensors in the computing device 111. For example, if the location of the computing device 101 changes by a predefined threshold amount or distance, the GNSS chipset 111 can generate a location event that can trigger the user identity logic 116 to update a user signature associated with the computing device 101.

The user identity logic 116 determines whether a network event can be obtained from the network interface 113 that is related to networks that are within communication range of the computing device 101 (307). If a network event can be obtained, then the network event is associated with a timestamp (309). A network event can include an identity of a wireless or other type of network to which the computing device 101 is coupled. A network event can include an identity of a wireless or other type of network of which the computing device 101 is within range. For example, a network interface 113 associated with the computing device 101 can generate an event when the computing device 101 connects to a particular network. The user identity logic 116 can associate identifying information regarding the network (e.g., SSID, MAC addresses of peer devices, etc.) with the user signature.

Similarly, the user identity logic 116 can determine whether a movement and/or acceleration event can be obtained from the gyroscope 107, accelerometer 109 and/or GNSS chipset 111 (311) and associate the movement with a timestamp (313). For example, the user identity logic 116 can obtain velocity data from the GNSS chipset 111, acceleration data from the accelerator 109, orientation data from the gyroscope 107, and associated any of these types of movement data with the user signature.

In this sense, detecting a location event, a network event, and/or a movement event are varying forms of detecting a behavior associated with a user who may be in possession of the mobile device. In this way, the user identity logic 116 detects one or more behaviors associated with the mobile device and generates a user signature based upon the detected behaviors. The user identity logic 116 can then update a user signature 117 associated with the computing device 101 with data about the detected event and the corresponding timestamp generated by the user identity logic 116 (315). In this way, the user identity logic 116 can develop and update a user signature that is based at least in part upon the user's behavior during various times of the day. The user identity logic 116 can then update the user signature 117 stored in the computing device (317).

Figure 4:
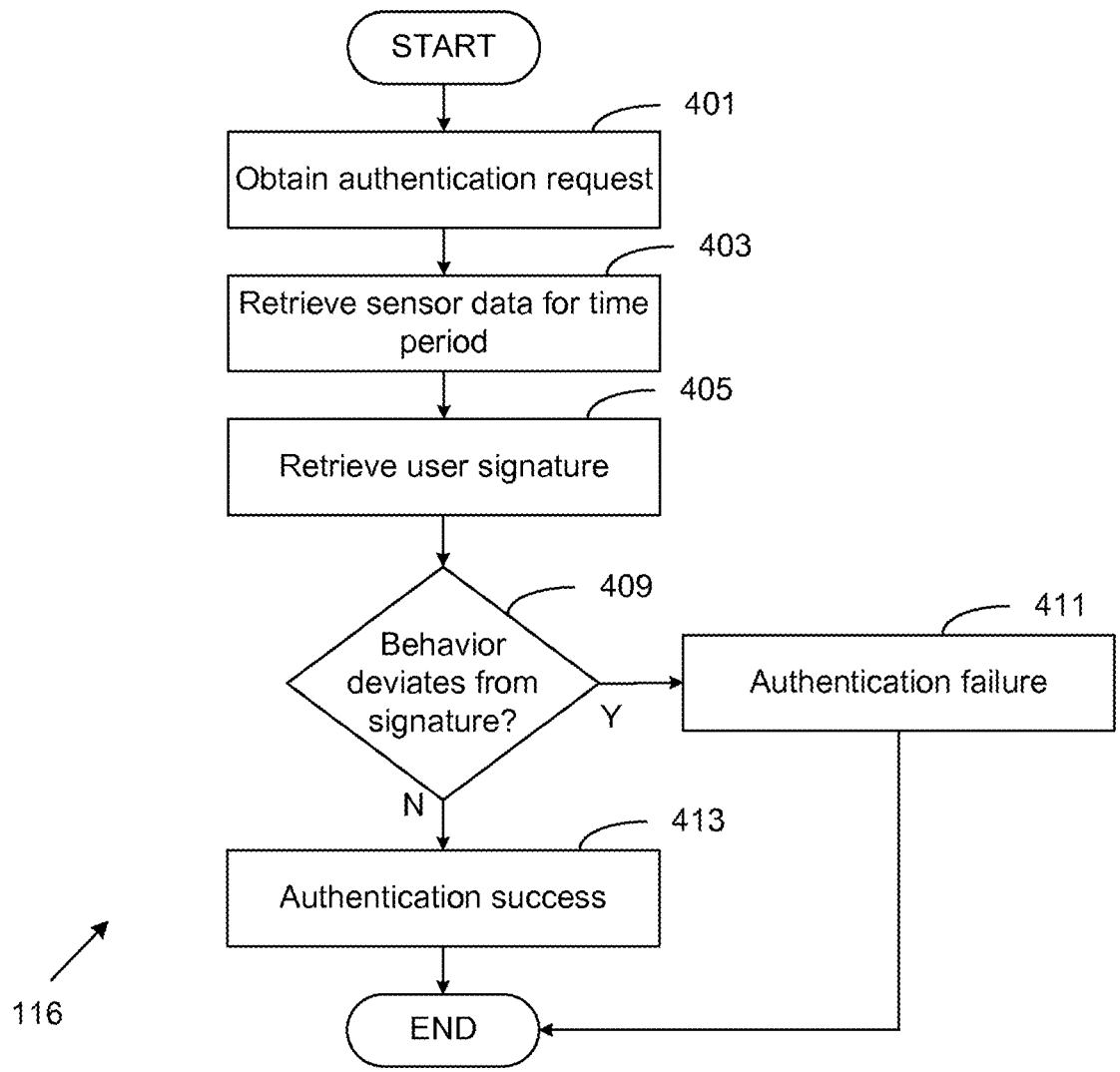
FIG. 4 is a flowchart illustrating yet another example of functionality implemented as portions of user identity logic executed in a computing device in the networked environment of FIG. 1 according to various embodiments of the present disclosure.

Referring next to FIG. 4, shown is a flowchart that provides one example of the operation of a portion of the user identity logic 116 to authenticate a user based upon a user signature 117 according to various embodiments. It is understood that the flowchart of FIG. 4 provides merely an example of the many different types of functional arrangements that may be employed to implement the operation of the portion of the user identity logic 116 as described herein. As an alternative, the flowchart of FIG. 4 may be viewed as depicting an example of steps of a method implemented in the computing device 101 (FIG. 1) according to one or more embodiments.

First, the user identity logic 116 can obtain an authentication request (401). As noted above, such an authentication request can be received from a system requesting authentication of a user associated with the computing device 101. Accordingly, the user identity logic 116 can then retrieve sensor data and/or events from the various sensors in the computing device 101 for a predefined time period preceding receipt of the request (403). For example, the user identity logic 116 can obtain sensor data for the preceding twenty-four hours or other time period and compare the behaviors reflected in the sensor data to the user signature. In this way, the user identity logic 116 can determine whether the user associated with the user signature 117 is in possession of the computing device 101 and has been using the device consistent with a daily routine of the user.

Therefore, the user identity logic 116 can then retrieve the user signature 117 corresponding to the computing device 101 (405). As noted above, the user signature 117 can be stored in an encrypted form in a memory, flash memory, magnetic storage, or any other storage medium. Next, the user identity logic 116 can determine whether the sensor data for the preceding time period reflects behavior that deviates from that embodied in the user signature 117 (409). If so, then the user identity logic 116 can generate an authentication failure (411). If not, then the user identity logic 116 can generate an authentication success and authenticate the user based upon the behaviors associated with the sensor data from the preceding time period and the user signature 117 (413). In order to determine whether sensor data indicates behavior that deviates from or adheres to a user signature 117, the user identity logic 116 can examine various events generated by the various sensors in the computing device 101 from the preceding time period.

For example, the user identity logic 116 can examine network events generated by the network interfaces 113 that identify local area networks and/or wide area networks to which the computing device 101 was connected or of which the computing device 101 was within range during the preceding time period. If the networks and/or the timestamps associated with the networks from the preceding time period fail to correspond to those specified in the user signature 117, the user identity logic 116 can generate an authentication failure.

Similarly, the user identity logic 116 can examine location and/or movement data during the preceding time period as well as timestamps associated with the location and/or movement data. For example, if the location and/or movement data during the preceding time period specifies a location and/or movement other than those specified by the user signature 117, the user identity logic 116 can generate an authentication failure. For example, the location data may specify that the computing device 101 was exhibiting location and/or movement data that deviates from the user signature 117. In such a scenario, an authentication failure can be generated. Conversely, if the location and/or movement data is consistent with that specified by the user signature 117 or within a predefined threshold range of the data specified by the user signature 117, the user identity logic 116 can generate an authentication success.

In some embodiments, the user identity logic 116 can identify an authentication level associated with the authentication request. For example, the entity requesting authentication can request varying levels of authentication based upon the importance of a transaction for which authentication is sought. Therefore, in authenticating a user based upon the user signature, the user identity logic 116 can allow for different levels of deviation in behaviors from the preceding time period from the behaviors specified by the user signature depending upon the authentication level indicated in the authentication request. For example, in the case of an authentication request seeking strict or a high level of authentication, the user identity logic 116 can allow for less deviation in behaviors from the preceding time period from the behaviors specified by the user signature. In the case of an authentication request seeking a lower level of authentication, the user identity logic 116 can allow for more deviation in behaviors from the preceding time period from behaviors specified by the user signature.

The flowcharts of FIGS. 2-4 show the functionality and operation of the user identity logic 116 executed by the computing device 101 according to various embodiments of the disclosure. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in the flowcharts of FIGS. 2-4 may be executed concurrently or with partial concurrence. Further, in some embodiments, one or more of the blocks shown in the flowcharts of FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including any executed in the computing device 101, that comprises software or code can be embodied in any non-transitory computer-readable medium for use by or in connection with an instruction execution system such as, for example, a processor, digital logic, and/or any other circuitry in a computer system or other system. In this sense, the code may comprise, for example, statements including instructions and declarations that can be fetched from the computer-readable medium and executed by the instruction execution system. In the context of the present disclosure, a "computer-readable medium" can be any medium that can contain, store, or maintain the code or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described the invention, at least the following is claimed:

1. A device comprising:
   at least one processor circuit configured to:
   identify a first behavioral pattern of a user over a first period of time based at least in part on a first plurality of data items generated by at least one sensor device over the first period of time, wherein the first plurality of data items relate to physical behaviors of the user that are external to the device, and a user signature is generated based at least in part on the first behavioral pattern of the user;

receive a request for authentication of the user, the request specifying an authentication level, wherein the authentication level is associated with a behavior deviation level;

identify a second behavioral pattern over a second period of time based at least in part on a second plurality of data items generated by the at least one sensor device over the second period of time;

determine a degree of deviation of the second behavioral pattern with respect to the user signature;

determine whether the degree of deviation satisfies the behavior deviation level associated with the authentication level, wherein different behavior deviation levels are satisfied by different degrees of deviation between the second behavioral pattern and the user signature, the behavior deviation level decreases as the authentication level with which the behavior deviation level is associated increases, and the behavior deviation level increases as the authentication level with which the behavior deviation level is associated decreases; and provide an authentication success indication when the degree of deviation satisfies the behavior deviation level, otherwise providing an authentication failure indication.

2. The device of claim 1, wherein the at least one processor circuit is further configured to:
receive the request for authentication from another device that is external to the device, and
provide the authentication success indication and the authentication failure indication to the another device.

3. The device of claim 1, wherein the request comprises a field that specifies the authentication level.

4. The device of claim 1, wherein the first behavioral pattern of the user comprises a daily routine of the user that is described by a sequence of movements of the user, each movement of the sequence being identified by at least a velocity and a location of the user.

5. The device of claim 1, wherein the second period of time is subsequent to the first period of time and the second period of time immediately precedes, or is immediately subsequent to, receipt of the request.

6. The device of claim 1, wherein the at least one processor circuit is further configured to:
encrypt the first behavioral pattern; and
transmit the first behavioral pattern that is encrypted to a remote server, wherein the user signature is generated by the remote server.

7. The device of claim 6, wherein the at least one processor circuit is further configured to:
encrypt the second behavioral pattern;
transmit the second behavioral pattern that is encrypted to the remote server; and
receive the degree of deviation from the remote server.

8. The device of claim 1, wherein the at least one sensor device is separate from the device.

9. The device of claim 1, wherein the device comprises the at least one sensor device.

10. The device of claim 1, wherein the at least one processor circuit is further configured to:
receive a password from the user;
verify the password of the user; and
provide the authentication success indication when the degree of deviation satisfies the behavior deviation level and the password is verified.

11. A method implemented by at least one device, the method comprising:

obtaining a first plurality of data items generated by at least one sensor device over a first period of time, wherein the first plurality of data items relate to behaviors of a user;

identifying, based at least in part on the first plurality of data items, a first behavioral pattern of the user over the first period of time, wherein a user signature is generated based at least in part on the first behavioral pattern of the user;

receiving a request for authentication of the user, the request specifying an authentication level for the request, wherein the authentication level is associated with a behavior deviation level;

obtaining a second plurality of data items, the second plurality of data items having been generated by the at least one sensor device over a second period of time that immediately preceded receiving the request for authentication;

identifying, based at least in part on the second plurality of data items, a second behavioral pattern of the user over the second period of time;

determining a degree of deviation of the second behavioral pattern of the user with respect to the user signature;

determining whether the degree of deviation satisfies the behavior deviation level associated with the authentication level, wherein different behavior deviation levels are satisfied by different degrees of deviation between the second behavioral pattern and the user signature, the behavior deviation level decreases as the authentication level with which the behavior deviation level is associated increases, and the behavior deviation level increases as the authentication level with which the behavior deviation level is associated decreases; and providing an authentication success indication when the degree of deviation satisfies the behavior deviation level, otherwise providing an authentication failure indication.

12. The method of claim 11, wherein the request for authentication is received over a network from another device that is external to the at least one device, and the authentication success indication and the authentication failure indication are provided to the another device over the network.

13. The method of claim 11, wherein the behaviors of the user comprise physical actions performed by the user that do not involve the at least one device.

14. The method of claim 11, wherein the request comprises a field that specifies the authentication level.

15. The method of claim 11, wherein the first behavioral pattern of the user comprises a daily routine of the user that is described by a sequence of movements of the user, each movement of the sequence being identified by at least a velocity and a location of the user.

16. The method of claim 11, further comprising:
encrypting the first behavioral pattern; and
transmitting the first behavioral pattern to a remote server.

17. The method of claim 16, wherein determining the degree of deviation of the second behavioral pattern of the user with respect to the first behavioral pattern of the user comprises:
encrypting the second behavioral pattern;
transmitting the second behavioral pattern to the remote server; and
receiving the degree of deviation from the remote server.

18. A computer program product comprising instructions stored in a tangible non-transitory computer-readable storage medium executed by a computing device, the instructions comprising:
instructions to identify a first behavioral pattern of a user for a first period of time based at least in part on monitored behaviors of the user over the first period of time and generate a user signature based at least in part on the first behavioral pattern of the user;

instructions to receive a request for authentication of the user, the request specifying an authentication level for the request, wherein the authentication level is associated with a behavior deviation level;

instructions to generate a second behavioral pattern of the user for a second period of time based at least in part on monitored behaviors of the user over the second period of time, wherein the second period of time immediately preceded receipt of the request;

instructions to determine a degree of deviation of the second behavioral pattern of the user with respect to the user signature;

instructions to determine whether the degree of deviation satisfies the behavior deviation level associated with the authentication level, wherein different behavior deviation levels are satisfied by different degrees of deviation between the second behavioral pattern and the user signature, the behavior deviation level decreases as the authentication level with which the behavior deviation level is associated increases, and the behavior deviation level increases as the authentication level with which the behavior deviation level is associated decreases; and instructions to provide an authentication success indication when the degree of deviation satisfies the behavior deviation level, otherwise providing an authentication failure indication.

19. The computer program product of claim 18, the instructions further comprising:

instructions to generate the user signature based at least in part on monitored behaviors of the user over at least two non-consecutive periods of time.

20. The computer program product of claim 19, wherein the monitored behaviors of the user occur in a physical environment of the user outside of the computing device.

\* \* \* \* \*